Figure 1:
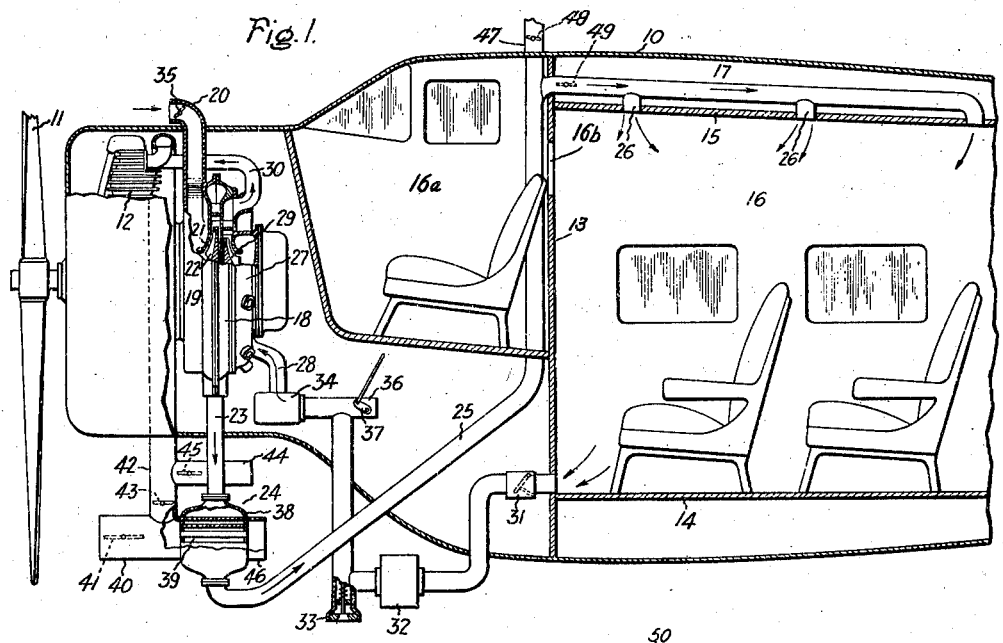

May 31, 1938.  S. R. PUFFER  2,119,402
AIRCRAFT
Filed June 26, 1935  3 Sheets-Sheet 1

Inventor:
Samuel R. Puffer,
by Harry E. Dunham
His Attorney.

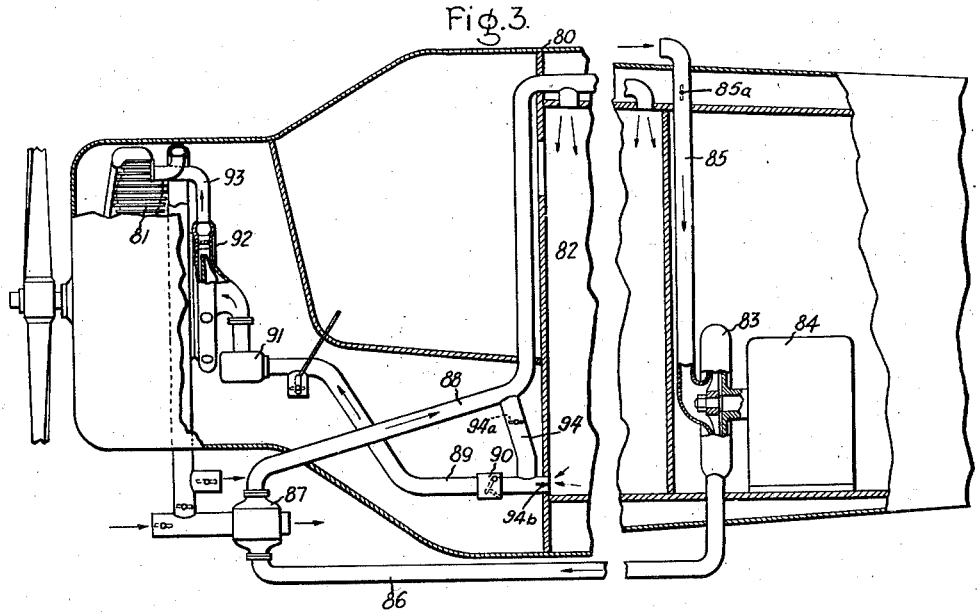
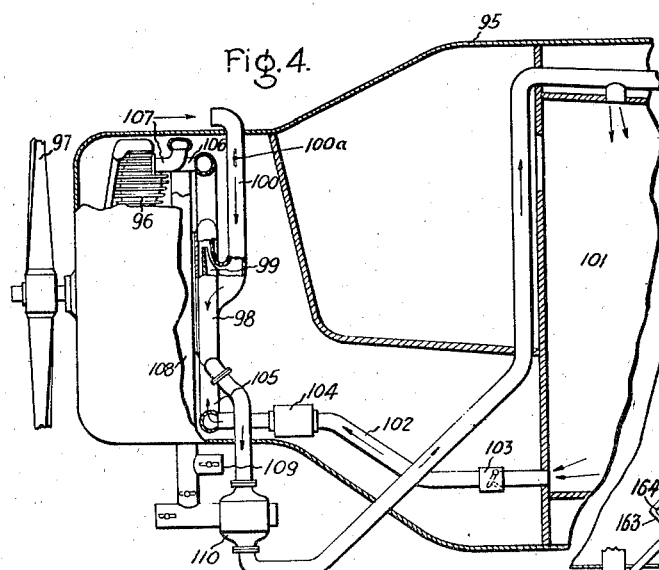
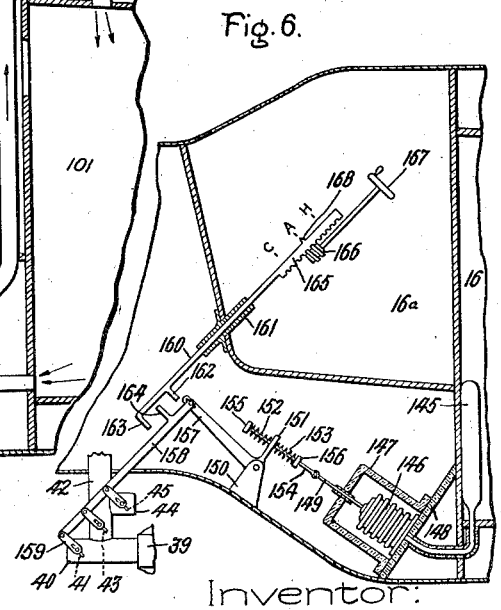

May 31, 1938.  S. R. PUFFER  2,119,402
AIRCRAFT
Filed June 26, 1935  3 Sheets-Sheet 3

Inventor:
Samuel R. Puffer,
by Harry E. Dunham
His Attorney.

Patented May 31, 1938

2,119,402

UNITED STATES PATENT OFFICE 2,119,402

AIRCRAFT

Samuel R. Puffer, Saugus, Mass., assignor to General Electric Company, a corporation of New York Application June 26, 1935, Serial No. 28,482

6 Claims. (Cl. 244—59)

The present invention relates to aircraft operated by supercharged combustion engines, although it is not necessarily limited thereto.

In recent years it has become more and more the general practice to supercharge combustion engines operated at altitudes of the order of several thousand feet above sea level in order to maintain good combustion in the engine. The requirement for supercharging at high altitudes is not limited to combustion engines but is desirable generally in connection with any kind of power plant, using a substance including air as operating medium. The present trend in the design and operation of aircraft is towards the attainment of higher altitudes whereby higher speeds may be gained. At higher altitudes, however, special means must be provided to make it possible for persons in the aircraft to withstand the low atmospheric pressure. It has been found that persons become uncomfortable at altitudes of the order of 10,000 ft. and above especially when the rise from sea level to such altitudes is rapid. To overcome this discomfort, it becomes necessary either to provide masks and oxygen tanks or sealed supercharged compartments. The provision of supercharged compartments is preferable because a person may feel perfectly comfortable in such a compartment for any length of time, which is not the case if a person is forced to wear special masks.

One object of my invention is to provide an improved construction and arrangement for supercharging aircraft power plants using a substance including air as an operating medium.

A second object of my invention is to provide an improved arrangement for supercharging an aircraft compartment or cabin.

A third object of my invention is to provide an improved arrangement for conditioning the temperature of an aircraft compartment.

A fourth object of my invention is to provide an improved arrangement for de-icing wing and other surfaces of an aircraft.

For a consideration of further objects and of what I believe to be novel and my invention, attention is directed to the following description and the claims appended thereto.

Broadly, an aircraft in accordance with my invention comprises a single supercharger for supercharging both an engine which may be an internal combustion engine and a compartment. Such compartment may be a passenger cabin, an operator's room or the like in which for various reasons it is desirable to maintain a certain pressure. From another viewpoint, the supercharger prevents the air pressure in the compartment from dropping below a certain minimum value. The supercharger may be built in and driven by the combustion engine for propelling the aircraft, or it may be separately driven and conveniently located in the aircraft.

In a preferred embodiment of my invention the compartment to be supercharged and the combustion engine or power plant are connected in series. In case of a single stage supercharger, the compartment is connected in series between the outlet of the supercharger and the inlet of the engine. This accomplishes several desirable objects. First, it supercharges the compartment which means it maintains a certain pressure therein. Second, it heats the compartment due to the heat of compression in the supercharger. Third, it cools the air discharged from the supercharger before it is conducted to the cylinders of an internal combustion engine. Fourth, it ventilates the compartment, and fifth, it reduces ice formation on the certain surfaces of the aircraft.

In case of a multi-stage supercharger, for instance, a supercharger having two stages which may be in the form of a single or separate units, the compartment to be supercharged is preferably connected between the outlet of the first supercharger stage and the inlet of the second supercharger stage. At moderate altitudes the compartment need not be supercharged. This is easily accomplished with the aforementioned two-stage supercharger by disconnecting or rendering ineffective the first stage thereof. In other cases the first stage may be used for de-icing purposes at low altitudes. A two-stage supercharger arrangement is especially desirable where an aircraft is intended for operation at altitudes of the order of, for instance, 20,000 ft. to supercharge the engine to sea level pressure and the compartment to an air pressure corresponding to an appreciable altitude, say 10,000 ft. If such two-stage supercharged aircraft is operated at altitudes below 10,000 ft., the first stage is disconnected or rendered inoperative or used for supplying heated air to elements subject to de-icing at low altitudes. The second stage then receives air either from the compartment, thereby ventilating the latter, or the second stage receives air directly from the atmosphere through a special conduit.

The conditioning of the air temperature in the compartment is effected in accordance with my invention by means utilizing the heat of compression in the supercharger, the available heat energy of the engine exhaust gases in case of a combustion engine, and finally the cooling effect caused by the slip stream of the propeller. To this end I provide a surface heat exchanger or heat transferring device which in substance represents a combined heater and cooler connected between the supercharger and the compartment and arranged to receive heating medium in the form of exhaust gases from the engine and cooling medium in the form of air from the atmosphere to heat or cool the air discharged from the supercharger.

For a full understanding of my invention, attention is directed to the accompanying drawings in which Figs. 1 to 5 are several examples of aircraft arrangements and Fig. 6 a detail view embodying my invention.

The arrangement of Fig. 1 comprises an aircraft in the form of an airplane with an outer body 10 and propelled by a propeller 11 driven by an engine, in the present instance an internal combustion engine 12. A partition 13 together with a floor 14 and a ceiling 15 within the body 10 form a sealable compartment, in the present instance a passenger cabin 16. A sealable pilot compartment 16a is provided ahead of the passenger cabin 16 and communicates with the latter through an opening or openings 16b in the partition 13. By a "sealable" compartment I mean a space arranged to be closed airtight, not necessarily hermetically tight, but sufficiently to prevent appreciable leakage of air from such space to the atmosphere. The upper wall of the body 10 and the ceiling 15 form a relatively narrow space 17.

The internal combustion engine 12 together with the compartment 16 are supercharged, in the present instance by a single, two-stage, built-in supercharger 18 driven in known manner from the engine crank shaft. The supercharger has a first stage 19 with an inlet conduit 20 for conducting air from the atmosphere to an impeller chamber 21. An impeller 22 rotatably disposed in the chamber compresses the air and discharges it through an intermediate or outlet conduit 23, whence the air is conducted through a surface heat exchanger or combined heater and cooler 24 through another conduit 25 having a plurality of branches 26 connected to the compartment 16. The branches 26 are connected to several spaced-apart points of the compartment 16 to uniformly conduct air thereto in order to prevent the formation of draft.

A second stage 27 of the supercharger has an inlet conduit 28 which in accordance with my invention is connected to the compartment 16 to receive supercharged air therefrom. The second stage 27 includes an impeller 29 for further compressing the air received from the compartment 16. A plurality of outlet conduits 30 are connected to the second stage of the supercharger for discharging compressed air to the different cylinders of the internal combustion engine 12. As will be noted, the conduit 28 connecting the compartment 16 with the second stage of the supercharger includes in the present instance a check valve 31, a cooler 32, a relief valve 33 opening outwardly to the atmosphere, and a carburettor 34. These elements are arranged in series in the order just described as regards the direction of flow of air therethrough. The check valve serves to prevent backflow of air or exhaust gases into the compartment during backfiring of the engine; the cooler 32 is provided to cool the air before it enters the second supercharger stage; the relief valve 33 permits the relief of excess pressure from the conduit to the atmosphere, especially during backfiring of the engine; and the carburettor 34 as is well known forms a source of supply of fuel for the engine. The fuel contained in the carburettor is mixed with the air forced therethrough and this mixture is further mixed and compressed in the second supercharger stage whence it is discharged to the cylinders of the engine 12.

Under certain conditions, that is, at lower altitudes, when the compartment 16 need not be supercharged it becomes desirable to put the supercharger out of operation. This is accomplished in the present instance by the provision of a butterfly valve 35 in the inlet conduit of the first stage. Closing of the valve reduces the flow of air to the first stage. Furthermore, a branch conduit 36 with a valve 37 is provided ahead of the carburettor 34 as regards the direction of the flow of air through the conduit 28 for admitting air directly from the atmosphere to the second stage of the supercharger. During normal operation the valve 35 is open and the valve 37 is closed. When the first stage 19 of the supercharger is put out of operation, the valve 35 is closed and the valve 37 is opened. This valve arrangement is more fully disclosed in the pending application of Sanford A. Moss, Serial No. 687,589, filed on August 24, 1933 and assigned to the same assignee as the present application.

The heat exchanger 24 connected between the conduits 23 and 25 is of the radiator or surface type and has an outer casing 38. A plurality of heat-exchanging or heat transferring tubes 39 are connected at their ends into openings in opposite walls of the casing 38. The air conducted through the casing 38 from the conduit 23 to the conduit 25 flows over the outer surfaces of the heat-exchanging tubes 39 whereby heat is exchanged between this air and a cooling or heating medium flowing through the interior of the tubes. This medium is either air from the atmosphere or exhaust gases from the internal combustion engine. Air from the atmosphere is conducted to the tubes 39 by a conduit 40 including a valve 41 and exhaust gases from the internal combustion engine 12 are conducted to the tubes 39 by a conduit 42 including a valve 43. The conduit 42 has a branch conduit 44 including a valve 45. The medium, air or exhaust gases, flowing through the heat-exchanging tubes 39 is discharged by a conduit 46. In the drawings the valve 41 is shown open, the valve 43 is closed and the valve 45 is opened. In this position of the valves, air from the slip stream of the propeller flows through the conduit 40 into the cooling tubes 39 and thereby causes cooling of the air discharged from the conduit 23 through the heat exchanger. The exhaust gases in the above valve position are discharged through the branch conduit 44. In the other end position of the valves 41, 43 and 45 no air is admitted from the atmosphere through the heat exchanger, but the exhaust gases from the engine flow through the heat exchanger and cause heating of the air conducted from the conduit 23 through the heat exchanger to the conduit 25. Any intermediate position of the valves 41, 43 and 45 may also be obtained, thereby securing any desired amount of heating or cooling of the air passing from the supercharger to the compartment. Thus, the provision of the supercharger and the heat exchanger permits conditioning of both the air temperature and the air pressure in the compartment 16. The air conditioning may be accomplished automatically as will be described hereinafter more in detail in connection with Fig. 6.

During cold weather conditions it frequently becomes necessary to de-ice the leading edge of the wings and it may also become desirable to de-ice the outer surfaces of the body or, from another viewpoint, to reduce or prevent icing of these surfaces because ice formation on the body of the aircraft increases its load and ice formation on the wings decreases their lifting power. This is accomplished, in the present instance with respect to the upper outer surface of the body 10, by means including the end portion of the conduit 25 disposed within the space 17. This end portion is of considerable length and thereby causes heating of the space 17, thus reducing the formation of ice on the upper surface of the body 10. The formation of ice on the edges of the wings is reduced by means including a conduit 47 connected to the conduit 25 for conducting heated air to the edges of the wings. Ice formation takes place mainly at lower altitudes and is not appreciable at altitudes of more than 10,000 feet. For this reason I provide a control valve 48 in the conduit 47 and another valve 49 in the conduit 25 alternately to permit supercharging of the compartment 16 at high altitudes and de-icing or prevention of ice formation on the leading edges of the wings at low altitudes. By this arrangement the supercharger is utilized as a means for de-icing certain parts of the airplane.

Figure 2:
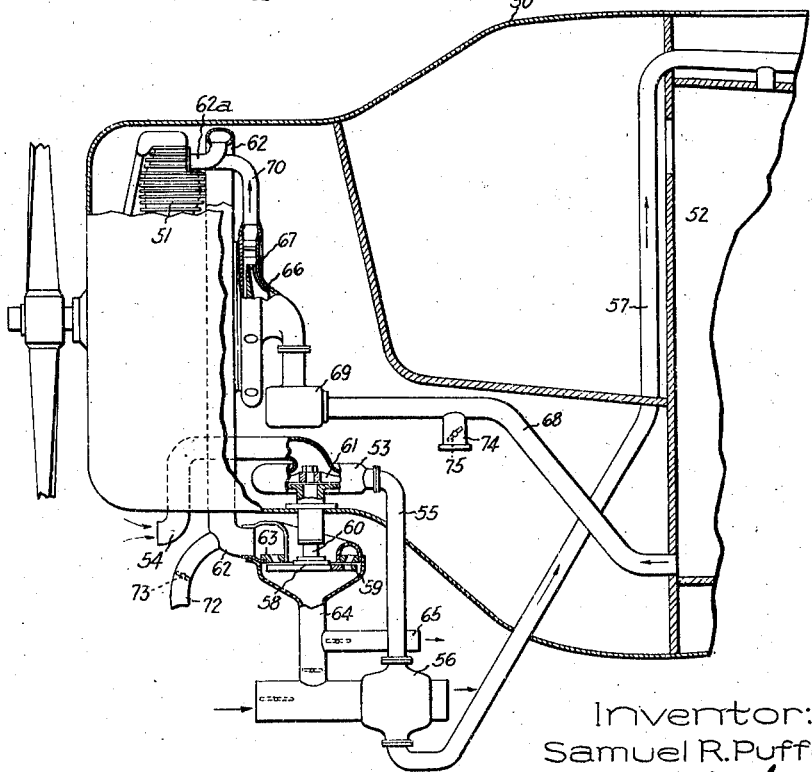

The arrangement of Fig. 2 is similar to the one described in connection with Fig. 1 but whereas in Fig. 1 a single supercharger with two stages is provided, the arrangement of Fig. 2 includes two separate single stage superchargers, one driven from the engine shaft and the other by a gas turbine receiving exhaust gases from the engine. More specifically, the arrangement comprises an aircraft having a body 50 and being driven by means including an internal combustion engine 51. A compartment 52 is formed within the body 50. The compartment 52 is sealable and may be supercharged by means including a supercharger 53 having an inlet conduit 54 for receiving air from the atmosphere and an outlet conduit 55 for discharging compressed air through the intermediary of a heat exchanger 56 corresponding to the heat exchanger 24 of Fig. 1 to the compartment 52, the heat exchanger 56 being connected to the compartment 52 by a conduit 57 corresponding to the conduit 25 of Fig. 1. The single stage supercharger 53, which forms the first stage of the supercharging means is driven by a gas turbine 58. The turbine has a bucket wheel 59 rotatably secured to a shaft 60 which also carries an impeller 61 of the supercharger. Exhaust gases of the internal combustion engine 51 are conducted to the bucket wheel 59 by means including a conduit 62 and a stationary nozzle diaphragm 63 the latter being secured to an end portion of the conduit 62 which portion forms a nozzle box. The conduit 62 represents a manifold which is connected to the engine cylinders by short conduits 62ª. The gases having passed through the bucket wheel 59 are discharged through a conduit 64 to the atmosphere either directly through a branch conduit 65 or indirectly through the heat exchanger 56.

The internal combustion engine 51 is supercharged by means of a supercharger 66 having an impeller 67 driven from the engine crank shaft. The supercharger receives air from the sealable compartment 52 through a conduit 68 including a carburettor 69. Air compressed by the supercharger is discharged through outlet conduits 70 connected to the engine cylinders. With this arrangement the energy put into the first supercharger for supplying compressed air to the compartment is regained or made available to perform further work by supercharging the engine or, from another viewpoint, the two superchargers represent a means for supercharging the internal combustion engine and this means is utilized at the same time to supercharge, heat and ventilate the sealable compartment 52. From another viewpoint, the compartment 52 constitutes a means for cooling the compressed air discharged by the first supercharger, thereby permitting operation of the arrangement without the provision of a special cooler intermediate the first and the second supercharger or, in case a cooler 56 is provided as in the present instance, to permit a smaller size cooler than would be necessary without the series connection of the compartment 52 between the two superchargers.

The engine exhaust conduit or manifold 62 includes a bypass 72 with a valve 73 near the inlet to the gas turbine for controlling the flow to the latter and interrupting the flow thereto whenever the supercharger 53 is not needed. With the valve 73 in open position, the exhaust gases are discharged to the atmosphere through the bypass or branch conduit 72. Opening of the valve 73 reduces the pressure in the nozzle box to such an extent that the turbine wheel, although rotating, is practically inoperative. When the aircraft is operated at low altitudes, the engine is supercharged by means of the second supercharger 66 only, which under such conditions receives air either from the compartment 52 or through a bypass or branch conduit 74 connected to the conduit 68 and communicating with the atmosphere. This conduit 74 has a valve 75 which is normally closed, that is, when both superchargers are operated, and which may be opened when the second supercharger only is operated.

The arrangement of Fig. 3 is similar to that just described in connection with Fig. 2 but includes a supercharger driven by a separate motor independent of the operation of the internal combustion engine. More specifically, the arrangement comprises an aircraft with a body 80 and propelled by means including an internal combustion engine 81. A compartment 82 is formed within the body. This compartment is arranged to be sealed and supercharged by a first supercharger 83 suitably disposed in a rear part of the aircraft 80. The supercharger 83 is driven by a motor 84 such as an electric motor or an auxiliary combustion engine. The supercharger 83 has a single stage receiving air from the atmosphere through an inlet conduit 85 including a valve 85a and discharging air through a conduit 86, a heat-transferring device or heat exchanger 87 and a conduit 88 connected in series to the compartment 82. During supercharging of the compartment 82, air is discharged from the latter through a conduit 89 including a check valve 90 and a carburettor 91 to the inlet of a second supercharger 92 driven by the engine 81 and discharging a mixture of compressed air and fuel through conduits 93 to the different cylinders of the engine. Under certain conditions it may become desirable to use only a part of the air discharged from the first supercharger 83 for supercharging the compartment 82 and to conduct the other part directly to the inlet of the second supercharger. This may be accomplished by means including a bypass 94 having a valve 94a and being connected between the conduits 88 and 89. Partial opening of the valve 94a causes a part of the air flowing through the conduit 88 to be bypassed through the bypass 94 to the conduit 89. A valve 94b is provided near the connection between the conduit 89 and the compartment 82 in order to prevent backflow of air into the cabin when the valve 94a is open.

In contrast to the arrangements described in connection with Figs. 1 to 3, which include two superchargers each, I provide in the arrangement shown in Fig. 4 a single stage supercharger for both a sealable compartment and an internal combustion engine or like power plant operated by a substance including air. The invention here again is shown in connection with an airplane having a body 95 and including an internal combustion engine 96 driving a propeller 97. The internal combustion engine 96 broadly represents a machine or other element of a power plant to which supercharged air must be supplied during certain operating conditions. This is accomplished by means including a single stage supercharger 98 having an impeller 99 driven through suitable gearing (not shown) from the engine crankshaft. Air is conducted from the atmosphere to the supercharger through an inlet conduit 100 including a valve 100a. In accordance with my invention, compressed air discharged from the supercharger 98 is conducted through a compartment 101 formed within the body 95, whence it is conducted through a conduit 102 including a check valve 103 and a carburettor 104 to a manifold 105 connected by conduits 106 to the cylinders of the engine. The exhaust gases of the internal combustion engine 96 are discharged through conduits 107 into a manifold 108, which latter normally discharges into the atmosphere through a conduit 109. Whenever it is desired to heat the compressed air discharged from the supercharger 98 into the compartment 102 the exhaust gases from the engine are conducted through a heat exchanger 110 disposed in the connection between the supercharger outlet and the compartment 101. The single stage supercharger arrangement shown in Fig. 4 may be used in connection with Diesel or gas engines receiving fuel by injection and including a carburettor following the supercharger. In this instance the air passes from the supercharger to the sealable compartment and therefrom through a carburettor to an intake manifold of the engine.

Figure 5:
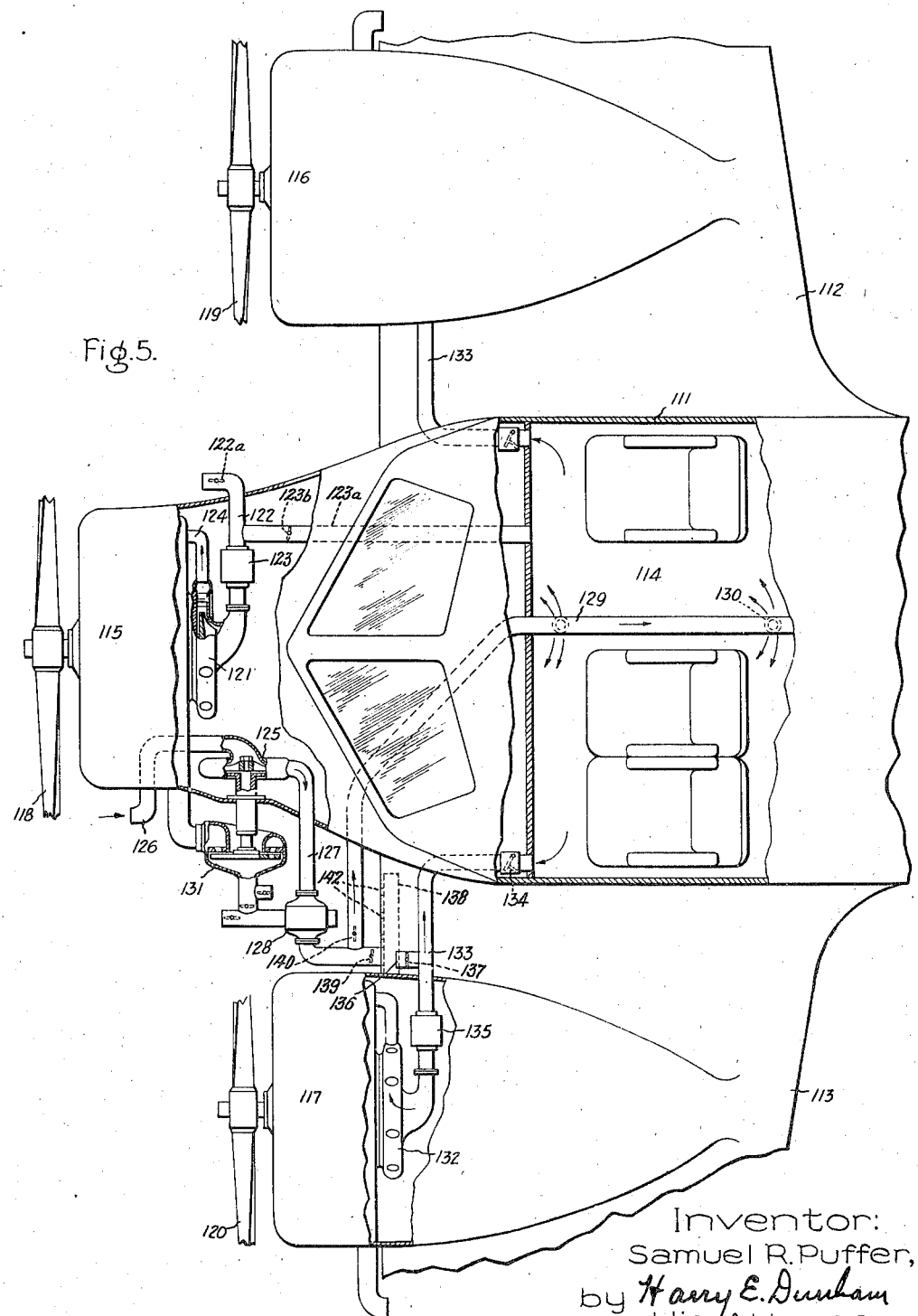

Fig. 5 shows a plan view of an airplane having a body 111 and wings 112 and 113 respectively. A compartment 114 is formed within the body. The airplane is driven by a plurality of power plants, in the present instance three internal combustion engines 115, 116 and 117 driving separate propellers 118, 119 and 120 respectively. The engine 115 may be supercharged by means of a supercharger 121 receiving air through an inlet conduit 122, communicating with the atmospheres. The conduit 122 has a valve 122a near its opening and also includes a carburettor 123. Another conduit 123a including a valve 123b is connected between the inlet of the carbureter and the compartment 114 to permit the supply of air from the compartment to the supercharger 121. The supercharger discharges through a plurality of outlet conduits 124 to the different cylinders of the engine. The sealable compartment 114 may be supercharged by a supercharger 125 having an inlet conduit 126 communicating with the atmosphere and an outlet conduit 127 connected to a heat exchanger 128 similar to the heat exchanger 24 of Fig. 1 and connected through a conduit 129 to the compartment 114. An end portion of the conduit 129 is disposed within the compartment 114 and has a plurality of outlets 130 to avoid the formation of draft within the compartment. The supercharger 125 is driven by a gas turbine 131 arranged similar to the gas turbine 58 of Fig. 2. The engines 116 and 117 have manifolds 132 arranged to receive supercharged air from the compartment 114 through separate conduits 133 whereby the power rating and consequently the speed at high altitude is increased. If desired, an additional gear-driven supercharger may be provided for the engines 116 and 117 similar to the arrangement with respect to the engine 115. Each conduit 133 includes a check valve 134 in proximity to the compartment 114 and a carbureter 135 in proximity to the manifold 132. During operation, the compartment 114 is supercharged by the supercharger 125 and the engines 116 and 117 are supercharged by the same supercharger 125 through the conduit connections 133 between the engines 116, 117 and the compartment 114. The check valves 134 prevent backflow of air and gases from the engines 116 and 117 to the compartment 114 in case of backfiring. Under certain conditions, when supercharging is not necessary, air may be admitted directly from the atmosphere to the conduit 133 of each engine through a bypass 136 including a valve 137.

At low altitudes, where supercharging is not needed, the gas turbine driven compressor 125 is utilized for reducing ice formation on the wings. This is accomplished by means including a conduit 138 including a valve 139 and connected to the discharge of the heater 128. A valve 140 is provided in the conduit 129 to close this conduit at low altitudes. Closing of the valve 140 and opening of the valve 139 causes a flow of heated air to the conduit 138, whence it is discharged through nozzle openings 142 towards the leading edge of the wing 113. With this arrangement the heat of compression of the supercharger or blower 125 and the heat energy of the exhaust gases of the internal combustion engine 115 are utilized for reducing the formation of ice on the leading edges of the wings to maintain or increase the lifting power of the aircraft.

Fig. 6 shows an arrangement for automatically controlling the temperature in the compartment. Like reference characters designate the same parts as in Fig. 1 and corresponding parts of Figs. 2 to 5 inclusive. As pointed out above, exhaust gases from the engine passing into the conduit 42 are conducted through the conduit 44 including the valve 45 to the atmosphere, or through the conduit 40 to the heat-transferring device 39. If it is desired to transfer a maximum amount of heat from the exhaust gases to the compressed air passed through the heat-transferring device 39, then valves 41 and 45 are closed and valve 43 is opened, and vice versa, if it is desired to discharge all of the exhaust gases directly to the atmosphere and effect maximum cooling of the compressed air to be conducted to the compartment 16. In an intermediate position of the valves, a part of the exhaust gases is passed through the heat-transferring device 39 and another part is directly discharged through the conduit 44 to the atmosphere. Such intermediate position is indicated in Fig. 6.

The arrangement for automatically controlling the valves 41, 43 and 45 in response to temperature changes in the compartment 16 comprises a temperature responsive device, in the present instance shown in the form of a hermetically sealed container or tube 145 disposed within the compartment 16 and communicating with a bellows 146. The bellows is surrounded by a heat-insulated body or cylinder 147. The bellows and the tube 145 are filled with a fluid such as a gas which expands as the temperature increases and contracts as the temperature in the compartment 16 decreases. Expansion and contraction of the gas within the bellows 146 cause the latter to expand and to collapse respectively. One end of the bellows is secured to a fixed support 148 whereas the other end is connected to a link 149. Expansion and contraction of the bellows then effect movement of the link 149 and this movement is transmitted to the valves by means including a bell-crank lever pivoted to a fulcrum 150. An arm 151 of the bell-crank lever is engaged by two springs, 152 and 153 respectively. These springs surround an extension 154 of the link 149 which extension projects slidably through an opening in the arm 151. The spring 152 is disposed between one side of the bell-crank lever and an abutment 155 on the extension 154, and the spring 153 is held between the opposite side of the bell-crank lever and an abutment 156 on the extension 154. During normal operation the two springs are in neutral or balanced condition. Another arm 157 of the bell-crank lever is pivotally connected by means of a lever 158 and links 159 to the valves 41, 43 and 45.

The operation of the device is as follows: Increasing temperature within the compartment 16 causes expansion of the fluid contained in the tube 145. This effects expansion of the bellows 146 which in turn causes turning movement of the bell-crank lever under the action of the springs 152 and 153. The bell-crank lever in this instance turns in counterclockwise direction, resulting in opening movement of the valves 41 and 45 and closing movement of the valve 43. This movement, as pointed out before, causes an increased amount of exhaust gases to be discharged directly to the atmosphere through the conduit 44 and simultaneously an increased flow of air from the atmosphere through the conduit 40 to the heat-transferring device 39, thus reducing the temperature of the compressed air supplied to the compartment 16.

Under certain conditions it may become desirable to position the valves 41, 43 and 45 manually. This may be accomplished in the present instance by means including a control rod 160 projecting through the wall of the pilot compartment 16a. To reduce at high altitudes air leakage from the pilot compartment to the atmosphere, a long sleeve 161 is secured to the wall of the pilot cabin to form a long channel, slidably engaging the lever 160. The lower end of the lever 160 has two projections, 162 and 163, which under certain conditions may engage a projection 164 on the lever 158. The upper end of the lever 160 forms a toothed rack 165 engaged by a worm 166, which latter may be rotated by means including a handwheel 167. The worm 166 prevents movement of the lever 160 due to differential air pressure between the atmosphere and the pilot compartment.

In the present instance the arrangement is set for automatic control. This is indicated by a pointer 168 on the rack 165 registering with a mark A (meaning automatic). If it is desired to cool the compartment 16, irrespective of the temperature therein or, from another viewpoint, if it is desired to prevent exhaust gases from passing through the heat-transferring device 39, the handwheel 167 is rotated in a direction in which the pointer 168 is moved downward until it registers with a mark C (meaning cool). Downward movement of the rack causes the projection 162 on the lever 160 to engage the projection 164 on the lever 158, thereby moving the latter downward to open the valves 41 and 45 and close the valve 43. If it is desired to effect heating of the compartment, that is, to utilize all the heat energy in the exhaust gases, irrespective of the temperature in the compartment 16, the rack 165 is moved upward by rotating the handle 157 until the pointer 168 registers with a mark H (meaning heat).

The automatic and manual valve control of Fig. 6 may be applied to certain control valves in Figs. 1 to 5 such as the inlet valve 35 in Fig. 1, the valve 73 in Fig. 2, the valve 85a in Fig. 3, the valve 100a in Fig. 4 and the valve 122a in Fig. 5.

It will be readily understood that the specific arrangements described hereinbefore represent examples only of modifications of my invention. My invention is not limited to aircraft, certain features being applicable to vehicles and like arrangements where supercharging is desirable.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. An aircraft including an internal combustion engine, multi-stage supercharging means for supercharging the engine having an inlet for conducting air from the atmosphere to the first stage and an outlet for conducting air from the last stage to the engine, a sealable compartment, and means for supercharging the compartment comprising a conduit for conducting compressed air from an intermediate stage of the supercharging means to the compartment and a second conduit for conducting air from the compartment to a succeeding stage of the supercharging means, the first conduit including means for heating and cooling the air therein, the second conduit including a cooler for cooling the air.

2. An aircraft including an internal combustion engine, multi-stage supercharging means for supercharging the engine, a sealable compartment, a conduit for conducting compressed air from an intermediate stage of the supercharging means to the sealable compartment to supercharge and heat it, and a second conduit for conducting air from the compartment to a higher stage of the supercharging means, the second conduit including a relief valve opening to atmosphere in case of backfiring of the engine and a control valve for admitting air from the atmosphere to the conduit.

3. The combination of a combined heater and cooler of the radiator type comprising a casing, means for conducting a fluid the temperature of which is to be conditioned through the casing, a plurality of tubes disposed in the casing, means for conducting a cooling medium through the tubes, other means for conducting a heating medium through the tubes, and valve means for controlling the flow of the heating and the cooling medium.

4. A vehicle including an internal combustion engine, a supercharger for supercharging the engine, a compartment in the vehicle, means for conditioning the air temperature in the compartment comprising means utilizing both the heat of compression of the supercharger and the available heat energy in the exhaust gases of the engine and air from the atmosphere.

5. An aircraft including a first and a second internal combustion engine, a built-in supercharger associated with the first engine for supercharging the first engine, a sealable compartment, means for supercharging the compartment comprising a second supercharger having an inlet conduit for receiving air from the atmosphere and an outlet conduit for discharging air to the compartment, means for driving said last named supercharger comprising a gas turbine arranged to receive exhaust gases from the first engine, means for supercharging the second engine comprising a conduit connected to the compartment, said built-in supercharger supercharging the first engine only without feeding through the cabin.

6. An aircraft including an internal combustion engine, a supercharger for supercharging the engine, a compartment, a conduit including a carburettor between the compartment and the inlet of the supercharger, a check valve in the conduit ahead of the carburettor to prevent backflow of gases into the compartment during back-firing of the engine, and a relief valve in the conduit intermediate the carburettor and the check valve to discharge gases into the atmosphere during back-firing.

SAMUEL R. PUFFER.